United States Patent [19]
Dorenbosch et al.

[11] Patent Number: 5,995,840
[45] Date of Patent: Nov. 30, 1999

[54] METHOD AND APPARATUS FOR DYNAMICALLY SELECTING A FREQUENCY REUSE PLAN FOR A RADIO MESSAGING SYSTEM

[75] Inventors: Jheroen Pieter Dorenbosch, Paradise; Robert L. Breeden, Colleyville, both of Tex.

[73] Assignee: Motorola, Inc., Schaumburg, Ill.

[21] Appl. No.: 08/895,932

[22] Filed: Jul. 17, 1997

[51] Int. Cl.[6] ........................................... H04Q 7/38
[52] U.S. Cl. ............................... 455/447; 455/525
[58] Field of Search ............................... 455/436, 437, 455/438, 447, 524, 525, 434, 450, 452, 464, 423, 67.1, 67.4, 67.6

[56] References Cited

U.S. PATENT DOCUMENTS

| | | |
|---|---|---|
| 4,550,443 | 10/1985 | Freeburg . |
| 4,875,038 | 10/1989 | Siwiak et al. . |
| 5,038,399 | 8/1991 | Bruckert .................. 455/447 |
| 5,142,691 | 8/1992 | Freeburg . |
| 5,293,641 | 3/1994 | Kallin et al. .............. 455/528 |
| 5,442,804 | 8/1995 | Gunmar et al. ........... 455/67.3 |
| 5,640,676 | 6/1997 | Garncarz et al. .......... 455/525 |
| 5,711,007 | 1/1998 | Lin et al. .................. 455/447 |
| 5,722,072 | 2/1998 | Crichton et al. ........... 455/525 |
| 5,724,662 | 3/1998 | Goldberg et al. .......... 455/525 |
| 5,732,358 | 3/1998 | Sawaya et al. ............ 455/525 |
| 5,752,197 | 5/1998 | Rautiola ................... 455/525 |
| 5,781,536 | 7/1998 | Ahmadi et al. ............ 455/447 |
| 5,850,605 | 12/1998 | Souissi et al. ............. 455/67.1 |

Primary Examiner—Dwayne D. Bost
Assistant Examiner—Jean A. Gelin
Attorney, Agent, or Firm—R. Louis Breeden

[57] ABSTRACT

A method and apparatus in a radio messaging system monitors (304, 404), by a plurality of base receivers (207), an inbound channel for an inbound transmission from a portable subscriber unit (122), and determines (306, 406) a subset of the plurality of base receivers that reliably receive the inbound transmission. The method and apparatus then selects (310, 408) a frequency reuse plan for the radio messaging system, based upon the subset.

18 Claims, 3 Drawing Sheets

METHOD AND APPARATUS FOR DYNAMICALLY SELECTING A FREQUENCY REUSE PLAN FOR A RADIO MESSAGING SYSTEM

FIELD OF THE INVENTION

This invention relates in general to radio communication systems, and more specifically to a method and apparatus in a two-way radio messaging system for dynamically selecting a frequency reuse plan for an outbound transmission from a fixed portion of the radio messaging system to a portable subscriber unit.

BACKGROUND OF THE INVENTION

Modern two-way messaging systems employ frequency reuse for spectrally efficient communication with portable subscriber units. Correct estimation of how many and which subscriber units can simultaneously receive different messages from different base transmitters without undue interference is difficult. A prior art technique has been for the subscriber unit to measure the quality of a received color code corresponding to a base transmitter. Another prior art technique has been to estimate the location of the subscriber unit from received signal strength at the base receivers.

These prior art techniques have not always provided a reliable estimate of the optimum frequency reuse plan for communication with the subscriber unit. Quality of color code reception and subscriber unit location cannot always determine how many and which base transmitters are within range of the subscriber unit.

Thus, what is needed is a method and apparatus that can dynamically select a frequency reuse plan for communicating with a portable subscriber unit. Preferably, the selected frequency reuse plan should be closely related to how many and/or which transmitters are within range of the subscriber unit.

SUMMARY OF THE INVENTION

An aspect of the present invention is a method in a two-way radio messaging system for dynamically selecting a frequency reuse plan. The method comprises the steps of monitoring, by a plurality of base receivers, an inbound channel for an inbound transmission from a portable subscriber unit, and determining a subset of the plurality of base receivers that reliably receive the inbound transmission. The method further comprises the step of selecting the frequency reuse plan, based upon the subset.

Another aspect of the present invention is a controller in a two-way radio messaging system for dynamically selecting a frequency reuse plan. The controller comprises a network interface for receiving a message from a message originator, and a processing system coupled to the network interface for processing the message. The controller further comprises an output interface coupled to the processing system for communicating with a plurality of base receivers. The processing system is programmed to monitor, through the plurality of base receivers, an inbound channel for an inbound transmission from a portable subscriber unit. The processing system is further programmed to determine a subset of the plurality of base receivers that reliably receive the inbound transmission, and to select the frequency reuse plan, based upon the subset.

DETAILED DESCRIPTION OF THE DRAWINGS

Figure 1:
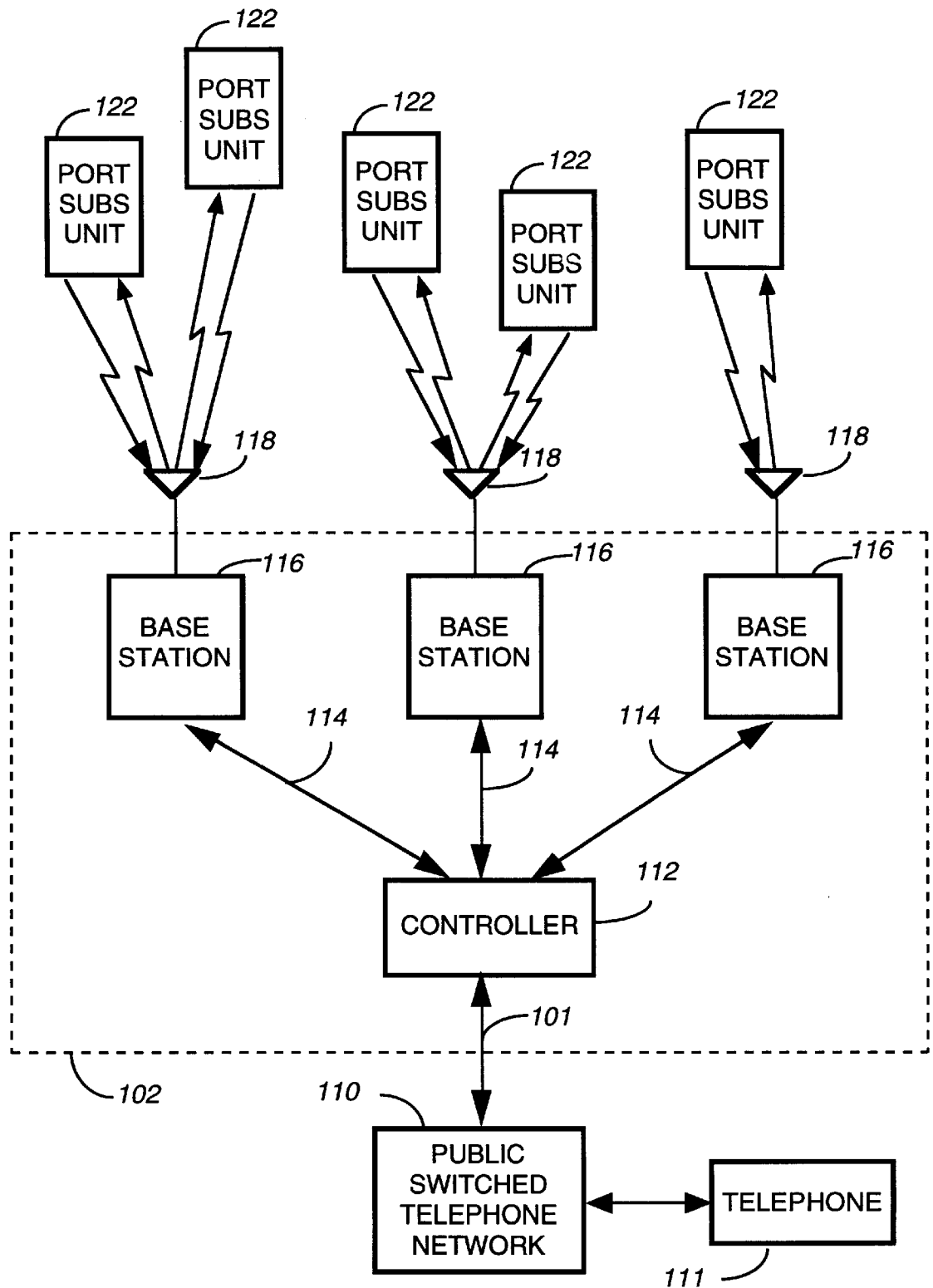
FIG. 1 is an electrical block diagram of a radio messaging system in accordance with the present invention.

Referring to FIG. 1, an electrical block diagram of a radio messaging system in accordance with the present invention comprises a fixed portion 102 including a controller 112 and a plurality of base stations 116, and a portable portion including a plurality of portable subscriber units 122, preferably having acknowledge-back capability. The base stations 116 are used for communicating with the portable subscriber units 122 utilizing conventional radio frequency (RF) techniques, and are coupled by communication links 114 to the controller 112, which controls the base stations 116.

The hardware of the controller 112 is preferably a combination of the Wireless Messaging Gateway (WMG™) Administrator! paging terminal, and the RF-Conductor!™ message distributor manufactured by Motorola, Inc. The hardware of the base stations 116 is preferably a combination of the Nucleus® Orchestra! transmitter and RF-Audience!™ receivers manufactured by Motorola, Inc. The portable subscriber units 122 are preferably conventional Tenor™ voice messaging units and Pagefinder™ data messaging units, also manufactured by Motorola, Inc. It will be appreciated that other similar hardware can be utilized as well for the controller 112, the base stations 116, and the portable subscriber units 122.

Each of the base stations 116 transmits RF signals to the portable subscriber units 122 via a transceiver antenna 118. The base stations 116 each receive RF signals from the plurality of portable subscriber units 122 via the transceiver antenna 118. The RF signals transmitted by the base stations 116 to the portable subscriber units 122 (outbound messages) comprise selective call addresses identifying the portable subscriber units 122, and voice and data messages originated by a caller, as well as commands originated by the controller 112 for adjusting operating parameters of the radio communication system. The RF signals transmitted by the portable subscriber units 122 to the base stations 116 (inbound messages) comprise responses that include scheduled messages, such as positive acknowledgments (ACKs) and negative acknowledgments (NAKs), and unscheduled messages, such as registration requests. An embodiment of an acknowledge-back messaging system is described in U.S. Pat. No. 4,875,038 issued Oct. 17, 1989 to Siwiak et al., which is hereby incorporated herein by reference.

The controller 112 preferably is coupled by telephone links 101 to a public switched telephone network (PSTN) 110 for receiving selective call message originations therefrom. Selective call originations comprising voice and data messages from the PSTN 110 can be generated, for example, from a conventional telephone 111 coupled to the PSTN 110. It will be appreciated that, alternatively, other types of communication networks, e.g., packet switched networks and local area networks, can be utilized as well for transporting originated messages to the controller 112.

The protocol utilized for outbound and inbound messages is preferably selected from Motorola's well-known FLEX™ family of digital selective call signaling protocols. These protocols utilize well-known error detection and error correction techniques and are therefore tolerant to bit errors occurring during transmission, provided that the bit errors are not too numerous in any one code word. By using well-known techniques to count the number of errors detected in a predetermined number of code words, the controller 112 can easily determine the bit error rate of a received signal. It will be appreciated that other suitable protocols can be used as well.

Figure 2:
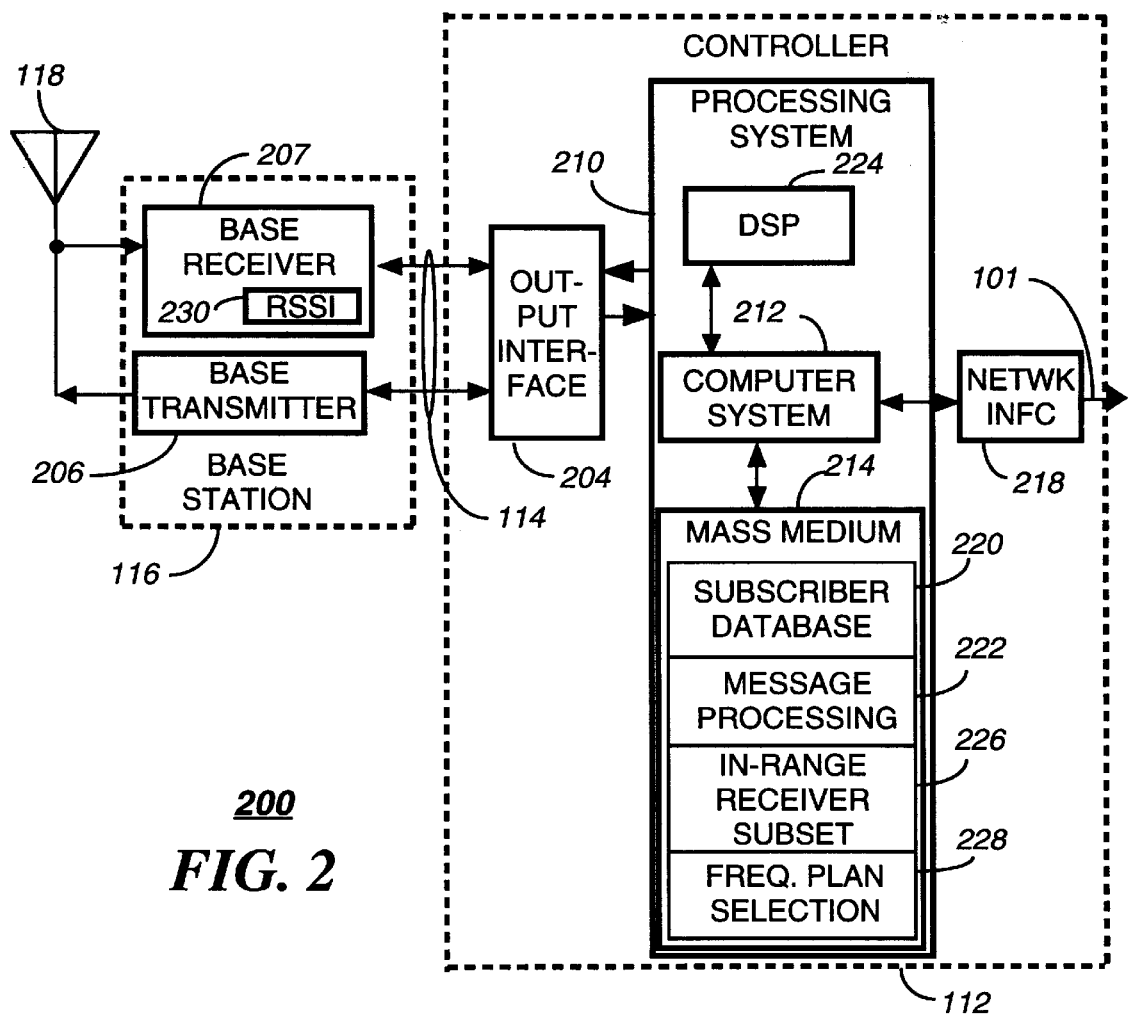
FIG. 2 is an electrical block diagram of portions of a base station and controller in accordance with the present invention.

FIG. 2 is a simplified electrical block diagram of portions of the base station 116 and controller 112 in accordance with the present invention. The controller 112 includes a processing system 210, a conventional output interface 204, and a conventional network interface 218. The base station 116 includes a base transmitter 206 and at least one base receiver 207. At least a portion of the processing performed on voice messages preferably is implemented in at least one conventional digital signal processor (DSP) 224 utilizing well-known techniques.

The processing system 210 is used for directing operations of the controller 112. The processing system 210 preferably is coupled through the output interface 204 to the base transmitter 206 via the communication link 114. The processing system 210 preferably also is coupled through the output interface 204 to the base receiver 207 via the communication link 114. The communication link 114 utilizes, for example, conventional means such as a direct wire line (telephone) link, a data communication link, or any number of radio frequency links, such as a radio frequency (RF) transceiver link, a microwave transceiver link, or a satellite link, just to mention a few. In one embodiment the base receiver 207 preferably includes a conventional received signal strength indicator (RSSI) 230 for measuring the received signal strength of an inbound transmission, utilizing well-known techniques. The processing system 210 is also coupled to the network interface 218 for accepting outbound voice and data messages originated by callers communicating via the PSTN 110 through the telephone links 101.

In order to perform the functions necessary for directing operations of the controller 112 and the base stations 116, the processing system 210 preferably includes a conventional computer system 212, and a conventional mass storage medium 214. The conventional mass storage medium 214 includes, for example, a subscriber database 220, comprising subscriber information such as addressing and programming options of the portable subscriber units 122.

The conventional computer system 212 is preferably programmed by way of software included in the conventional mass storage medium 214 for performing the operations and features required in accordance with the present invention. The conventional computer system 212 preferably comprises a plurality of processors such as VME Sparc™ processors manufactured by Sun Microsystems, Inc. These processors include memory such as dynamic random access memory (DRAM), which serves as a temporary memory storage device for program execution, and scratch pad processing such as, for example, storing and queuing messages originated by callers using the PSTN 110, processing acknowledgments received from the portable subscriber units 122, and protocol processing of messages destined for the portable subscriber units 122. The conventional mass storage medium 214 is preferably a conventional hard disk mass storage device.

It will be appreciated that other types of conventional computer systems 212 can be utilized, and that additional computer systems 212, DSPs 224 and mass storage media 214 of the same or alternative type can be added as required to handle the processing requirements of the processing system 210. It will be further appreciated that additional base receivers 207 either remote from or collocated with the base transmitter 206 can be utilized to achieve a desired inbound sensitivity, and that additional, separate antennas 118 can be utilized for the base transmitter 206 and the base receivers 207.

The mass medium 214 preferably includes software and various databases utilized in accordance with the present invention. A message processing element 222 is included for processing the voice and data messages. In particular, the mass medium 214 also includes an in-range receiver subset element 226 and a frequency plan selection element 228, which program the processing system 210 to perform in accordance with the present invention, as is described further below. It will be appreciated that the controller 112 and the base station 116 can be either collocated or remote from one another, depending upon system size and architecture. It will be further appreciated that in large systems, functional elements of the controller 112 can be distributed among a plurality of networked controllers.

Figure 3:
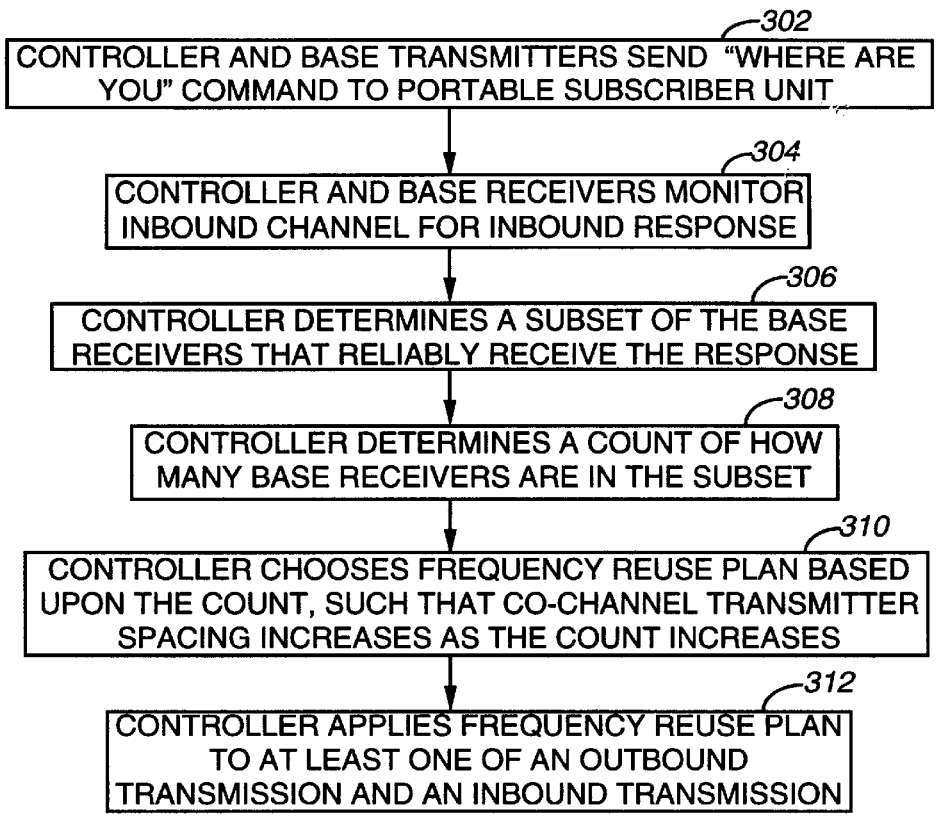
FIG. 3 is an exemplary flow chart depicting operation of a first embodiment of the radio messaging system in accordance with the present invention.

FIG. 3 is an exemplary flow chart 300 depicting operation of a first embodiment of the radio messaging system in accordance with the present invention. The flow begins with the controller 112 and the base transmitters 206 cooperating to send 302 a "where are you" (WRU) command to one of the portable subscriber units 122. The controller 112 and the base receivers 207 then monitor 304 the inbound channel for an inbound response from the portable subscriber unit 122. As the response is received by the base receivers 207, the controller 112 and base receivers 207 cooperate to determine 306 a subset of the base receivers that are reliably receiving the response. Reliable reception is determined as follows. In one embodiment, for example, the base receivers 207 each measure the received signal strength with the RSSI 230 and report the measured signal strength to the controller 112. When forming the subset of the base receivers 207 the controller 112 includes a base receiver 207 in the subset only when the received signal strength measured for the base receiver 207 is greater than a predetermined threshold. In a second embodiment, for example, the processing system 210 determines an error rate of each of the received signals, utilizing well-known error detection techniques. Then, when forming the subset of the base receivers 207, the processing system 210 includes a base receiver 207 in the subset only when the error rate measured for the base receiver 207 is less than a predetermined threshold. It will be appreciated that, alternatively, other techniques, e.g., requiring a signal-to-noise ratio greater than a predetermined threshold, can be utilized to determine which base receivers should be included in the subset as having "reliably received" the inbound transmission.

The controller 112 next determines 308 a count of how many base receivers 207 are in the subset. The controller 112 accesses the frequency plan selection element 228 to choose 310 a frequency reuse plan based upon the count. Preferably the frequency plan selection element 228 is preprogrammed with a selection of predetermined frequency reuse plans cross referenced with the count such that co-channel spacing increases as the count increases. The controller 112 then preferably applies 312 the chosen frequency reuse plan to a next outbound transmission directed to the portable subscriber unit 122. Alternatively, the controller can apply the chosen frequency reuse plan to a next inbound transmission from the portable subscriber unit 122 instead of, or in addition to, applying the plan to the outbound transmission. (The controller can direct the portable subscriber unit 122 to use a specific inbound channel through well-known commands included in the transmission protocol.)

Figure 4:
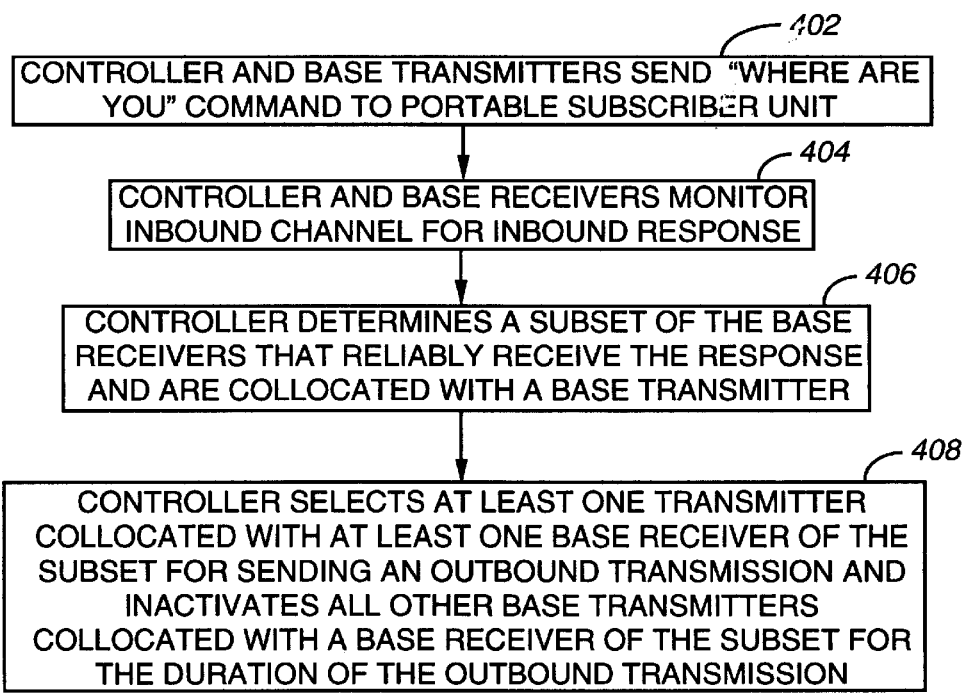
FIG. 4 is an exemplary flow chart depicting operation of a second embodiment of the radio messaging system in accordance with the present invention.

FIG. 4 is an exemplary flow chart 400 depicting operation of a second embodiment of the radio messaging system in accordance with the present invention. The first two steps of the flow chart 400 are identical to the first two steps of the flow chart 300. At step 406 the controller 112 determines a subset of the base receivers 207 that reliably receive the inbound response AND are collocated with a base transmitter 206. The controller 112 then selects 408 at least one base transmitter 206 collocated with at least one base receiver 207 for sending a next outbound transmission to the portable subscriber unit 122. During the outbound transmission, the controller 112 also inactivates for the duration of the outbound transmission all base transmitters other than the at least one base transmitter 206 that are collocated with a base receiver included in the subset. By operating in this manner, the controller 112 advantageously dynamically forms and applies a frequency reuse plan which prevents base transmitters that are within range of the portable subscriber unit 122 from interfering with the outbound transmission.

Thus, it should be clear from the preceding disclosure that the present invention provides a method and apparatus in a radio messaging system that advantageously dynamically selects a frequency reuse plan for an outbound and/or inbound communication with a portable subscriber unit. Desirably, the selected frequency reuse plan is determined from a subset of transmitters measured to be within range of the portable subscriber unit.

Many modifications and variations of the present invention are possible in light of the above teachings. Thus, it is to be understood that, within the scope of the appended claims, the invention may be practiced other than as described herein above.

What is claimed is:

1. A method in a two-way radio messaging system for dynamically selecting a frequency reuse plan, comprising the steps of:
    monitoring, by a plurality of base receivers, an inbound channel for an inbound transmission from a portable subscriber unit;
    determining a count of how many base receivers are in a subset of the plurality of base receivers that reliably receive the inbound transmission; and
    selecting the frequency reuse plan, based upon the count.

2. The method of claim 1, wherein the determining step comprises the step of determining the subset of the plurality of base receivers that reliably receive the inbound transmission and are collocated with a base transmitter.

3. The method of claim 1, further comprising the step of applying the frequency reuse plan to at least one of an outbound transmission and an inbound transmission.

4. The method of claim 1, wherein the monitoring step comprises the step of monitoring the inbound channel in response to having sent a command to the portable subscriber unit.

5. The method of claim 1, wherein the determining step comprises the steps of:
    measuring by the plurality of base receivers a received signal strength of the inbound transmission; and
    including a base receiver in the subset only when the received signal strength measured for the base receiver is greater than a predetermined threshold.

6. The method of claim 1, wherein the determining step comprises the steps of:
    measuring by the plurality of base receivers an error rate generated by the inbound transmission; and
    including a base receiver in the subset only when the error rate measured for the base receiver is less than a predetermined threshold.

7. The method of claim 1, wherein the selecting step comprises the step of selecting at least one base transmitter collocated with at least one base receiver of the subset for sending an outbound transmission.

8. The method of claim 7, wherein the selecting step further comprises the step of inactivating all base transmitters collocated with a base receiver of the subset other than the at least one base transmitter during the outbound transmission.

9. The method of claim 1, wherein the selecting step comprises the step of selecting the frequency reuse plan such that co-channel transmitter spacing increases as the count increases.

10. A controller in a two-way radio messaging system for dynamically selecting a frequency reuse plan, the controller comprising:
    a network interface for receiving a message from a message originator;
    a processing system coupled to the network interface for processing the message; and
    an output interface coupled to the processing system for communicating with a plurality of base receivers,
    wherein the processing system is programmed to:
    monitor, through the plurality of base receivers, an inbound channel for an inbound transmission from a portable subscriber unit;
    determine a count of how many base receivers are in a subset of the plurality of base receivers that reliably receive the inbound transmission; and
    select the frequency reuse plan, based upon the count.

11. The controller of claim 10, wherein the processing system is further programmed to determine the subset of the plurality of base receivers that reliably receive the inbound transmission and are collocated with a base transmitter.

12. The controller of claim 10, wherein the processing system is further programmed to apply the frequency reuse plan to at least one of an outbound transmission and an inbound transmission.

13. The controller of claim 10, wherein the processing system is further programmed to monitor the inbound channel in response to having sent a command to the portable subscriber unit.

14. The controller of claim 10, wherein the processing system is further programmed to:
    measure through the plurality of base receivers a received signal strength of the inbound transmission; and
    include a base receiver in the subset only when the received signal strength measured for the base receiver is greater than a predetermined threshold.

15. The controller of claim 10, wherein the processing system is further programmed to:
    measure through the plurality of base receivers an error rate generated by the inbound transmission; and
    include a base receiver in the subset only when the error rate measured for the base receiver is less than a predetermined threshold.

16. The controller of claim 10, wherein the processing system is further programmed to select at least one base transmitter collocated with at least one base receiver of the subset for sending an outbound transmission.

17. The controller of claim 16, wherein the processing system is further programmed to inactivate all base transmitters collocated with a base receiver of the subset other than the at least one base transmitter during the outbound transmission.

18. The controller of claim 10, wherein the processing system is further programmed to select the frequency reuse plan such that co-channel transmitter spacing increases as the count increases.

* * * * *